(12) United States Patent
Rehkopf

(10) Patent No.: US 6,224,135 B1
(45) Date of Patent: May 1, 2001

(54) AIR DEFLECTOR FOR MOTOR VEHICLES

(76) Inventor: John W. Rehkopf, 1050 Leitht St., Maumee, OH (US) 43537

( * ) Notice: Subject to any disclaimer, the term of this patent is extended or adjusted under 35 U.S.C. 154(b) by 0 days.

(21) Appl. No.: 09/566,791

(22) Filed: May 7, 2000

(51) Int. Cl.[7] ........................................ B60J 1/02
(52) U.S. Cl. .................... 296/91; 296/152; 296/180.1
(58) Field of Search ................. 296/91, 152, 180.1

(56) References Cited

U.S. PATENT DOCUMENTS

| | | |
|---|---|---|
| 2,575,933 * | 11/1951 | Thorne . |
| 2,714,036 * | 7/1955 | Gentile . |
| 3,089,728 * | 5/1963 | Shumaker . |
| 3,276,811 * | 10/1966 | Schmidt . |
| 3,294,439 * | 12/1966 | Phillips . |
| 3,330,454 * | 7/1967 | Bott . |
| 4,309,053 * | 1/1982 | Lett ...................................... 296/1 S |
| 4,339,145 * | 7/1982 | Botts et al. ............................ 296/1 S |
| 5,094,497 * | 3/1992 | Hartung et al. ......................... 296/91 |
| 5,292,166 * | 3/1994 | Emery .................................... 296/91 |
| 5,382,070 * | 1/1995 | Turner ................................ 296/180.1 |

* cited by examiner

Primary Examiner—D. Glenn Dayoan
Assistant Examiner—Mickki D. Murray

(57) ABSTRACT

The subject invention is an air deflector for a motor vehicle that is adapted to be attached to the posterior portion of a roof structure of a motor vehicle for purposes of directing the flow of air over the roof of a moving motor vehicle downwardly over the rear surface of the motor vehicle, said deflector comprising an air collector member having an internal air passage that is curved downwardly to deflect air movements from a horizontal flow pattern to a substantial vertical flow directed downwardly adjacent to the posterior surface of the vehicle, such device having a concave lower surface adapted to fit conformingly over the rear portion of the roof, with attachment means affixed to such lower surface.

1 Claim, 2 Drawing Sheets

AIR DEFLECTOR FOR MOTOR VEHICLES

KNOWN PRIOR ART

The follow comprise a number of the patents that Applicant has found as relevant to the status of the prior art:

(A) U.S. Pat. No. 3,843,195
(B) U.S. Pat. No. 3,904,239
(C) U.S. Pat. No. 3,853,371
(D) U.S. Pat. No. 3,973,478
(E) U.S. Pat. No. 3,922,032

DISCUSSION OF PRIOR ART AND BACKGROUND OF INVENTION

The subject invention relates to the devices and processes used to deflect the aerodynamic flow of air over the upper surface of a motor vehicle while the vehicle is moving. Such deflectors are variously and differentially structured to accomplish one or more functions. Some air deflectors are structured and deployed to deflect air away from vehicle surfaces that directly blunt the air flow, such as flat, vertical surfaces facing towards the vehicle's usual direction of movement, such air deflectors are primarily equipped and structured to reduce the resultant drag effect on the movement of the vehicle and thereby improve gas mileage.

Other air deflectors are appropriately structured to deflect the air flow over the roof of a vehicle to help yield downward force components to keep the rear portion of the vehicle stabilized relative to the wheel contact with the roadway.

Still other functions are accomplished by air deflectors, one of which is to direct the flow of air over the roof of a moving vehicle downwardly over the posterior vertical surface of the vehicle. Such deflectors are adapted to utilize air flowing over such surface process whereby the resultant redirected air flow cleanses dust, dirt, and other material accumulation that obscures the view through windows on such rear surface. The rear portion of the vehicle particularly the relatively vertical, flat surface of such vehicle, tend to collect dirt, dust and it is difficult to keep such clean for viewing and other purposes.

There are several devices conceived and structured in the existing art that are adapted to be retrofitted over the roof of a vehicle, particularly the van-type structure. Such devices are adapted to be affixed in some manner to the upper rear surface of the vehicle having means to receive the rearward flow of air to deflect it as stated.

In this regard there are several disadvantages to existing devices. One such disadvantage is that they are not generally structured as a universal fit to conform to the various roof structures of the different vans manufactured. Another disadvantage is that the existing air deflection structures are structured with attachment means that invade the integrity of the vehicle or roof. More specifically, most such air deflectors are affixed through insert means that are adapted to penetrate the vehicle's metallic roof or outer surface, which damages the vehicle. Other disadvantages exist in this regard.

By reason of these shortcomings, the subject invention is conceived as a means to improve such air deflector structures, and the subject invention is conceived accordingly, with the following objects.

OBJECTS OF INVENTION

It is an object of the subject invention to provide an improved air deflector for a motor vehicle;

Another object of the subject invention is to provide an improved air deflector for helping to clean the posterior areas of motor vehicles;

A further object of the subject invention is to provide an improved air deflector for a van-type motor vehicle;

Still another object of the subject invention is to provide an improved structure for appending to the roof of a motor vehicle for deflecting air flow to the rear surface areas of the vehicle;

Yet another object of the subject invention is to provide an improved structure that provides improved air deflection as a motor vehicle moves forward;

A further object is to provide a more efficient and effective means for air flow cleansing of the posterior areas of a motor vehicle;

Other and further objects of the subject invention will be apparent from a reading of the description taken in conjunction with the claims.

DRAWINGS

DESCRIPTION OF GENERAL EMBODIMENT AND SUMMARY OF INVENTION

Figure 1:
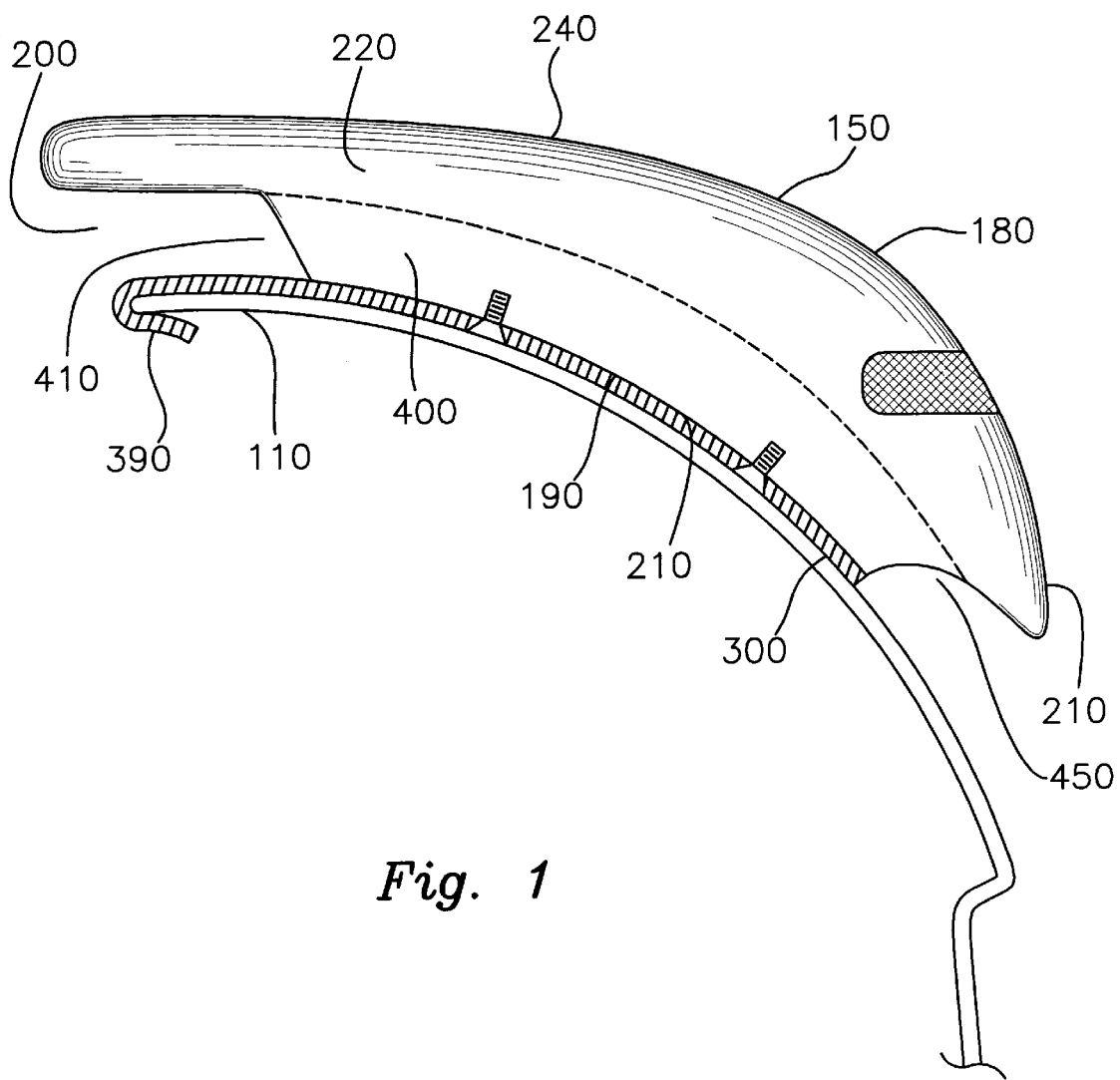
FIG. 1 is a side elevational view of the subject invention, as shown in cross sectional configuration demonstrating how the subject apparatus is appended to a motor vehicle.

The subject invention is an air deflector for a motor vehicle that is adapted to be attached to the posterior portion of a roof structure of a motor vehicle for purposes of directing the flow of air over the roof of a moving motor vehicle downwardly over the rear surface of a motor vehicle, said deflector comprising an air collector member having an internal air passage that is curved downwardly to deflect air movements from a horizontal flow pattern to a substantial vertical flow directed downwardly adjacent to the posterior surface of the vehicle, such device having a concave lower surface adapted to fit conformingly over the rear portion of the roof, with attachment means affixed to such lower surface.

DESCRIPTION OF PREFERRED EMBODIMENT

In describing the preferred embodiment of the subject invention, the following description is of only one specific and preferred embodiment of the subject invention and as a consequence, the following description shall not be considered as limiting the scope of the subject invention.

The subject structural concept of the subject invention centers on the use of the air flow over the roof of a moving motor vehicle to air cleanse the rear surface portion of a motor vehicle, particularly the outer surface of the back panel of a van-type vehicle. Generally, the apparatus directs such air flow for an air-fluid circulation system directed downwardly over the outer surface of the back windows and back door panel to keep such surface dust and dirt free. The subject device is generally an air deflector apparatus designed and structured to be retrofitted to the roof of motor vehicles, such as a van-type motor vehicle, and the like. The apparatus herein comprises a deflector panel having an internal air flow chamber adapted to receive and collect air moving over the upper surface of the roof into the confines of the air flow chamber to be funneled therethrough in a constricted manner and thence directed downwardly through the downwardly curved chamber so that the air flow is vented from the internal chamber into the outer surface of the back panel of the vehicle so as to continuously air cleanse such surface.

Specific attention is directed to the drawings in which a land-based motor vehicle 10 is shown. As seen in the drawings, particularly FIGS. 1 and 2, motor vehicle 10 as shown incorporates the features of the subject invention, and as can be observed, motor vehicle 10 shown in part has the general features of a conventionally structured and styled van-type motor vehicle having a front section 20 and a posterior section 30. Such motor vehicle may have any type of engine, not shown, so long as it is structured and adapted to be the primary motive power source for the motor vehicle 10. Moreover, it is to be noted that the precise structure and pertinent features of the motor vehicle 10 may be varied without affecting the applicability of the subject invention. In this latter regard, it is to be understood that the concepts of the invention herein are provided as an auxiliary structure for the motor vehicle 10.

Moreover, motor vehicle 10 has a passenger section 50 disposed between the front section 20 and the rear section 30 of such motor vehicle. Rear section 30 of motor vehicle in most vehicles houses seating areas as well as a storage area 65. Additionally, motor vehicle 10 has a front axle 60 on which are mounted lo rotatable wheels, such as left front wheel 70 shown in FIG. 1. Motor vehicle 10 also has a rear axle 80 on which rotatable wheels, such as left front wheel 70 shown in FIG. 1. Motor vehicle 10 also has a rear axle 80 on which rotatable wheels are mounted, such as left rear wheel 90 as seen in FIG. 1. In some vehicles the front wheels are structured to be drive wheels while in others the rear wheels are adapted as the drive wheels. In others, both front and back wheels function as the drive wheels. However, the subject invention shall not be considered as being limited to a vehicle of the type specified above, and it is to be understood that the subject invention is equally applicable to other types of land-based vehicles of varying or differing structures.

However, as seen in the drawings, vehicle 10 has a level upper roof surface 110 and a rear panel 120 which has an outer substantially vertical surface.

The air deflector apparatus system 150 is adapted to be fitted over the upper surface roof 10 in a conforming manner so as to maximize the utilization of the dynamic air flow over the upper surface of the roof. Air deflector member 150 functions as stated to divert the flow of air over the moving roof vehicle to permit passage of such air down to the immediate area of the outer surface of the back panel of the vehicle 10.

Figure 2:
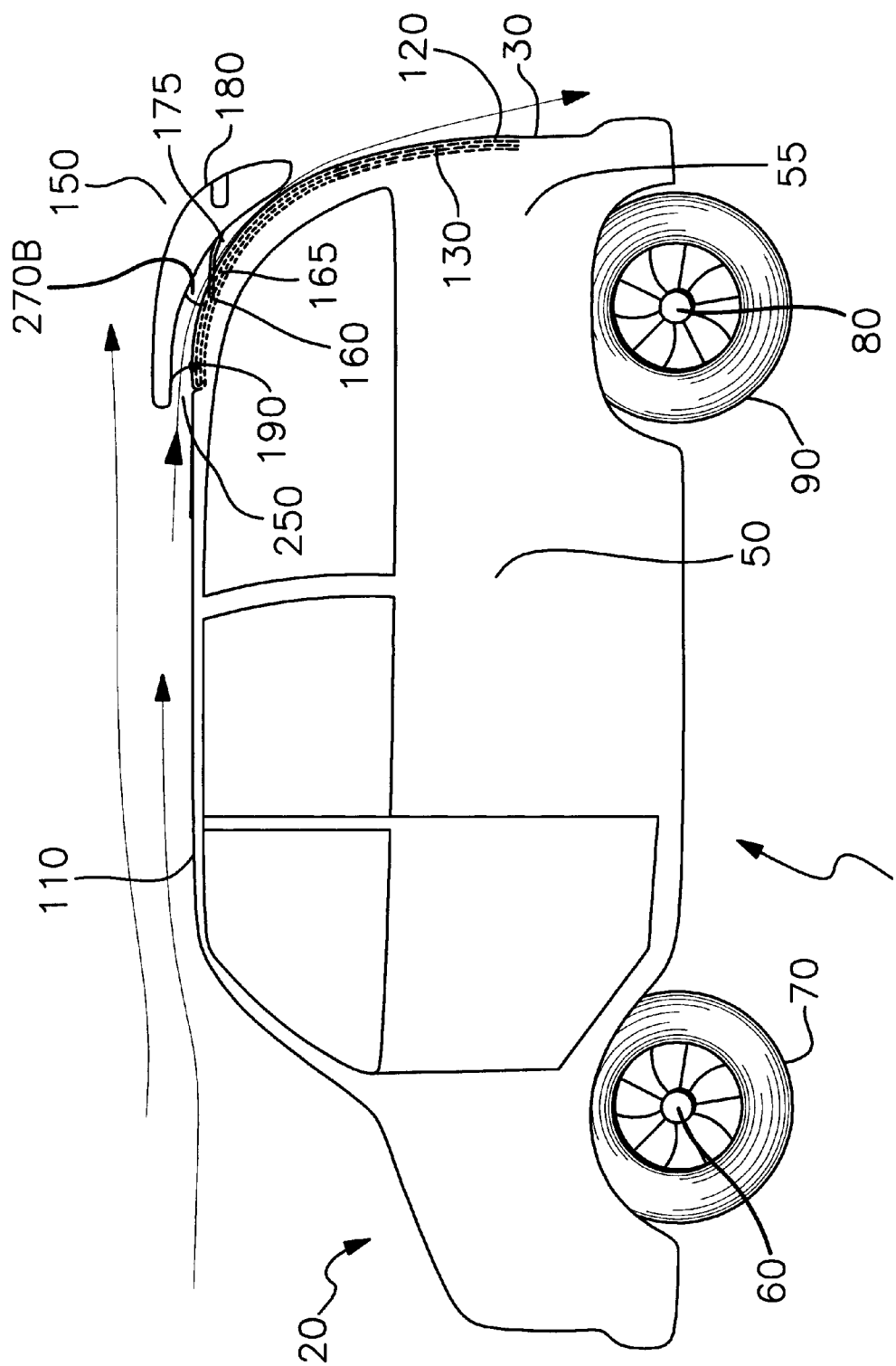
FIG. 2 is a side elevational view, in section, of the subject air deflector.

In the preferred embodiment air deflector member 150 is disposed optimally one the rear portion of the roof 110 of vehicle 10 that is substantially in a position adjacent where the rear panel door is located, as seen in FIG. 2.

In the preferred embodiment of the subject invention, as seen in FIG. 2, the air deflector member 150 is comprised of preferably a plastic-based member and is an elongated member having an upper surface 180 and a lower surface 190. The respective upper surface and lower surface extend longitudinally from a front or leading edge portion 200 to a posterior portion 210. Flanking the lateral portions of the upper surface 180 and lower surface 190 are side edges 220 and 240. Moreover, in the preferred embodiment of the subject invention, as can be seen in FIG. 2, the lower surface 190 of the air deflector 150 is curved in a concave manner as viewed from the bottom thereof so that such lower surface 190 can be conformingly placed and affixed over the downwardly curved rear portion of the vehicle, as seen in FIG. 2. More particularly, as seen in FIG. 2, the lower surface 190 is slightly curved in a concave manner as it extends from the front edge 200 rearwardly and such curvature is increased substantially at the most rearward portion so that the lower surface becomes vertically disposable downwardly in a direction somewhat parallel to the rear surface of vehicle 10.

More specifically, the air deflector 100 has a curved undersurface 210 which can be conformingly affixed to the upper surface of the roof of vehicle 10 as more particularly seen in the drawings. In order to affix the undersurface of the air deflector to the roof, such undersurface is coated with some form of adhesive substance 300, which will adhere the undersurface to the upper surface of the roof in an affixed position, such as the position seen in FIGS. 1 and 2. It is optimal that this adhesive substance 300 be of such composition that it will not damage the surface of the roof of the vehicle and is easily removed when the air deflector is to be removed for any purpose.

Another embodiment of the subject invention includes the use of a sheet metal stamping configures to fit conformingly against the lower surface of the air deflector, as seen, which stamping has upwardly projecting fittings that can be inserted into the body of the air deflector, as seen, to affix said stamping to the air deflector. In this embodiment, the lower surface of the stamping is provided with a bonding tape to hold the stamping to the upper surface of the van, as seen in FIG. 2. Moreover, the front end of such stamping is provided with a curved frontal lip 390 that is adapted to be seated around the upper edge of the rear door 395 of the vehicle 10. This further secures the stamping and air deflector to the vehicle 10.

As can be further seen from the drawings, integrally disposed through the complete longitudinal extent of the air deflector from its leading edge to the rear edge, is an open air flow chamber 400 adapted to receive moving oncoming air on its front end at air inlet opening 410 and pass such air rearwardly through chamber 400 to air outlet opening 450. As can be seen from the drawings, air that passes through the chamber 400 through air outlet opening 450 passes, by reason of the downward bend of the channel, directly downwardly next to the outer rear surface of vehicle 10, as schematically shown.

What is claimed is:

1. An deflector to be affixed in part over a roof of a motor vehicle roof and in part to a rear door on said vehicle comprising:

(A) a longitudinally extending member having a front end and a posterior end, with such front end having an air inlet opening extending into an internally disposed air flow chamber which extends through said member to an air outlet opening, such chamber being curved downwardly as it extends towards the posterior end of such member so that said air outlet opening projects vertically downwardly;

(B) attachment means to affix said member to the roof through an intermediate attachment member having a curved lip to affix to a portion of the rear door on said vehicle.

* * * * *